(12) United States Patent
Ball et al.

(10) Patent No.: US 9,114,892 B1
(45) Date of Patent: Aug. 25, 2015

(54) MULTIPLE STAGE TRACTOR PROPULSION VEHICLE

(75) Inventors: James M. Ball, Huntington Beach, CA (US); Aaron J. Kutzmann, Long Beach, CA (US); David A. Deamer, Seal Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 357 days.

(21) Appl. No.: 13/562,637

(22) Filed: Jul. 31, 2012

(51) Int. Cl.
  *B64G 1/40* (2006.01)
  *B64G 1/00* (2006.01)

(52) U.S. Cl.
  CPC ............... *B64G 1/401* (2013.01); *B64G 1/002* (2013.01); *B64G 1/005* (2013.01); *B64G 1/402* (2013.01)

(58) Field of Classification Search
  CPC .......... B64G 1/002; B64G 1/40; B64G 1/402; B64G 1/401; B64G 1/641; B64G 9/71; B64G 9/00; F42B 15/36
  USPC ............. 244/244, 171.1, 172.2, 172.3, 173.1, 244/158.1
  See application file for complete search history.

(56) References Cited

U.S. PATENT DOCUMENTS

| | | | |
|---|---|---|---|
| 2,683,415 A | | 7/1954 | Wilson |
| 3,747,874 A | * | 7/1973 | Johnsen ...................... 244/53 R |
| 3,934,512 A | * | 1/1976 | Adachi .......................... 102/377 |
| 4,017,040 A | | 4/1977 | Dillinger et al. |
| 4,185,558 A | * | 1/1980 | Quinville .................... 244/159.1 |
| 4,519,315 A | * | 5/1985 | Arszman ....................... 102/377 |
| 5,129,602 A | * | 7/1992 | Leonard ..................... 244/172.2 |
| 5,143,328 A | * | 9/1992 | Leonard ..................... 244/171.3 |
| 5,295,642 A | * | 3/1994 | Palmer ................................ 244/2 |
| 6,446,905 B1 | * | 9/2002 | Campbell et al. .................. 244/2 |
| 6,454,216 B1 | * | 9/2002 | Kiselev et al. ............... 244/159.3 |
| 6,494,035 B1 | | 12/2002 | Garcia |
| 6,685,141 B2 | * | 2/2004 | Penn .......................... 244/171.1 |
| 7,104,507 B1 | * | 9/2006 | Knight ....................... 244/171.1 |
| 7,152,635 B2 | | 12/2006 | Moravec et al. |
| 7,204,868 B2 | | 4/2007 | Snow, Jr. |
| 7,484,692 B1 | * | 2/2009 | McKinney et al. ......... 244/172.3 |
| 7,642,491 B2 | * | 1/2010 | Kusic ........................... 244/3.22 |
| 7,753,315 B2 | * | 7/2010 | Troy .......................... 244/171.3 |
| 8,002,219 B2 | * | 8/2011 | Camarda et al. ........... 244/171.3 |
| 2002/0139901 A1 | * | 10/2002 | Penn .............................. 244/162 |
| 2007/0012821 A1 | * | 1/2007 | Buehler ..................... 244/171.9 |
| 2008/0230649 A1 | * | 9/2008 | Kusic ............................. 244/3.1 |
| 2008/0265099 A1 | * | 10/2008 | Camarda et al. ........... 244/171.1 |
| 2009/0211258 A1 | | 8/2009 | Bulman |

(Continued)

OTHER PUBLICATIONS

Directory of U.S. Military Rockets and Missiles LIM-49; Western Electric/McDonnell Douglas LIM-49 Nike Zeus/Spartan; 2001-2002; http://www.designation-systems.net/dusrm/m-49.html.

(Continued)

*Primary Examiner* — Benjamin P Lee
(74) *Attorney, Agent, or Firm* — Parsons Behle & Latimer

(57) ABSTRACT

A multiple stage orbital delivery vehicle that uses tractor propulsion to launch the vehicle into space. Only the upper stage of the vehicle includes an engine and avionics allowing the lower stages to be only liquid propellant tanks that may be dumped when empty. The liquid propellant may be either monopropellant or bi-propellant. The upper stage may include multiple nozzles that burn the propellant. Alternatively, the upper stage may include an aerospike engine instead of nozzles. The multiple stage orbital delivery vehicle may be air launched from an airborne aircraft or may be launched from the ground.

18 Claims, 4 Drawing Sheets

(56) References Cited

U.S. PATENT DOCUMENTS

2012/0233983 A1\* 9/2012 Bulman .................... 60/229
2013/0043352 A1\* 2/2013 Bahn et al. ............. 244/171.1
2014/0263842 A1\* 9/2014 Salkeld .................. 244/159.3

OTHER PUBLICATIONS

Marchand, Michael Captain USMC, et al; "Mine Clearance System, A Makeover We Can Live With," 2006 Insensitive Munitions & Energetic Materials Technology Symposium, Bristol, UK Apr. 24-28, 2006.

\* cited by examiner

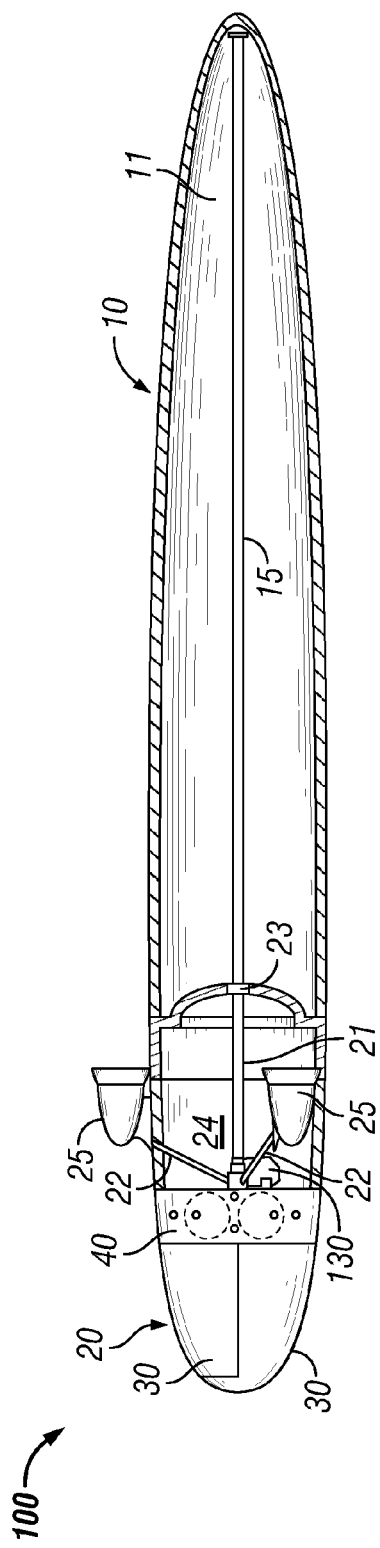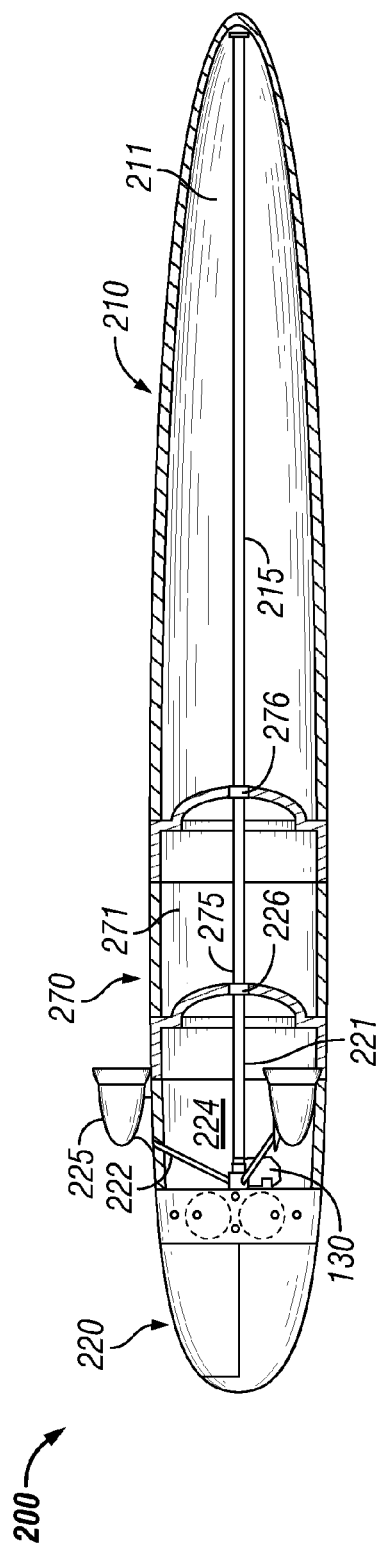
FIG. 6
FIG. 7

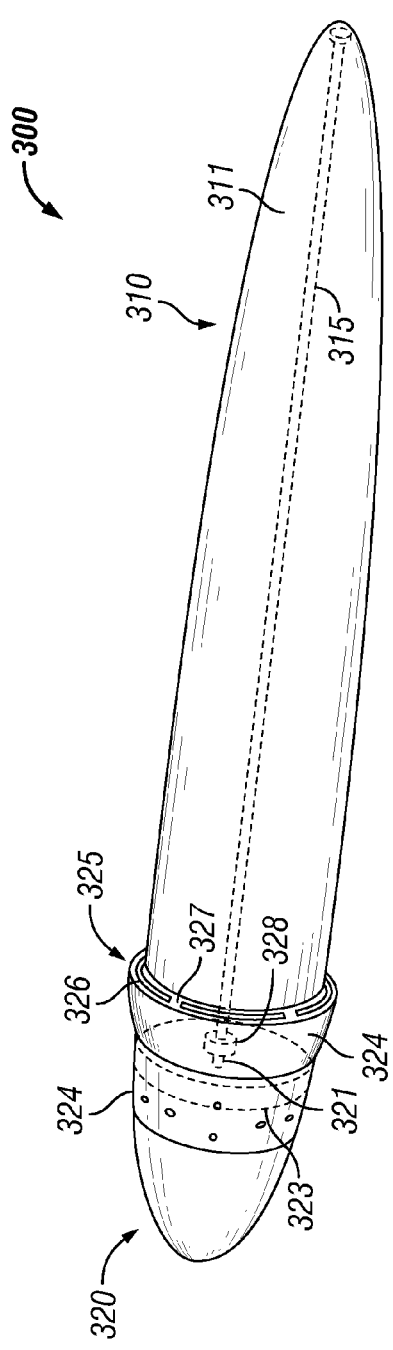
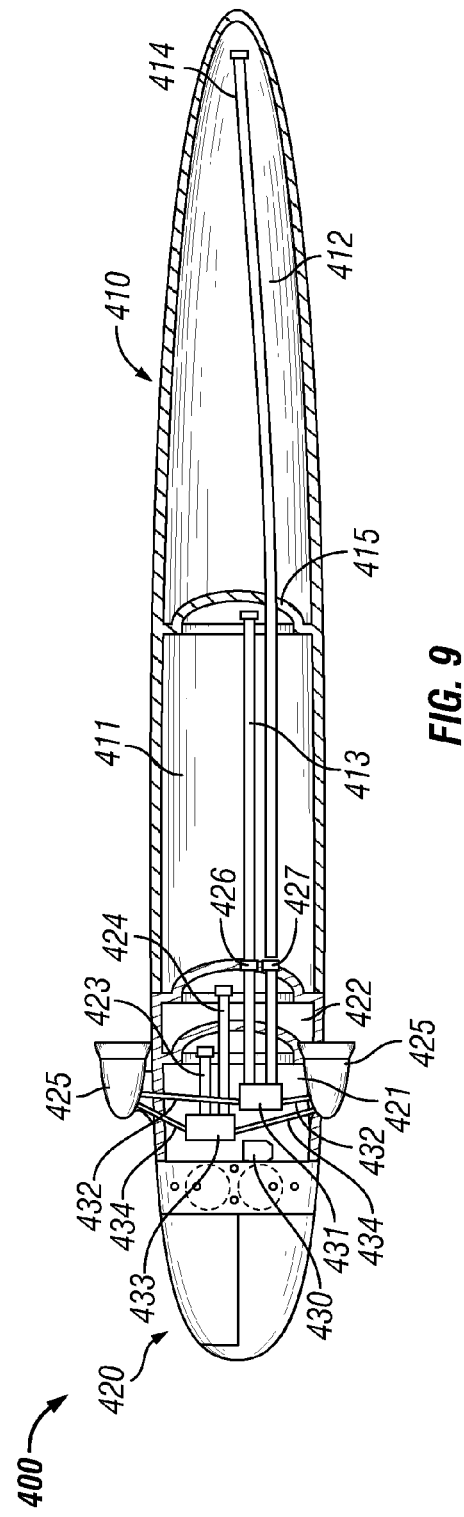
FIG. 8
FIG. 9

MULTIPLE STAGE TRACTOR PROPULSION VEHICLE

BACKGROUND

1. Field of the Disclosure

The embodiments described herein relate to a multiple stage orbital delivery vehicle that uses tractor propulsion.

2. Description of the Related Art

Multiple stage rockets have been used to launch orbiting devices, such as satellites, in the past. These have included both ground and air launched systems. However, the multiple stage rockets are complex, requiring both engines and control actuation systems to steer each stage. These control systems typically utilize actuators in both the pitch and yaw control planes to point the engine nozzle in a method referred to as thrust vector control, and require either electrical or hydraulic power sources which are added cost and complexity. Each stage has to be ignited as the lower stage is dropped from the vehicle. If a stage fails to ignite, the vehicle may not be successful in delivering the satellite into orbit. Further, conventional small multiple stage rockets often use solid propellant stages, which are heavier, less efficient, and more expensive than liquid propellant. Once solid propellant has been ignited it is difficult to stop the combustion until the entire propellant has been consumed unless higher complexity pintle techniques are used. Varying thrust or throttling the thrust level is also a challenge for solid propellant rocket motors.

Further, launch vehicle overall reliability is a function of part count, and increasing the launch vehicle reliability needs to be addressed by either increasing the reliability of individual components with an associated expense, or else reducing the number of components.

SUMMARY

The present disclosure is directed to a multiple stage orbital delivery vehicle that uses tractor propulsion and overcomes some of the problems and disadvantages discussed above. The present disclosure is directed to the simplicity of a multistage launch vehicle employing only a single set of engines resulting in a lower overall part count, higher reliability, and lower cost compared to multiple stages each having separate engines and steering actuation systems. These advantages are magnified for smaller payload and air launched systems since the cost of engines, steering actuation, and support subsystems for each stage can dominate the total costs for smaller launch systems. The reliability of a simpler, lower part count implementation, particularly one employing monopropellant, is lower cost than multiple stages each with their own propulsion designed for the same level of reliability.

One embodiment of a multiple stage orbital delivery vehicle comprises a first stage releasably connected to the orbital delivery vehicle. The first stage includes a first fuel tank and first fuel system. The first fuel system may include a first fuel line. The orbital delivery vehicle includes a second stage including a second fuel tank and a second fuel system. The second fuel system may include second fuel line in releasable fluid communication with the first fuel line of the first fuel system. The second stage comprises one or more engines in fluid communication with the first and second fuel systems. The one or more engines use fuel from the first fuel tank or the second fuel tank. In an embodiment, only a single stage of the orbital delivery vehicle includes an engine.

The multiple stage orbital delivery vehicle may further comprise a payload bay that may be selectively opened. The multiple stage orbital delivery vehicle may further comprise a spacecraft positioned in the payload bay. The first fuel tank and the second fuel tank may be adapted to contain a liquid propellant, which may be a monopropellant or a bi-propellant. The second fuel line may include a valve to prevent leakage of fuel from the second fuel tank upon the disconnection of the first stage from the orbital delivery vehicle. The orbital delivery vehicle may include multiple engines each having a nozzle spaced around the exterior of the second stage. The orbital delivery vehicle may include a single engine having multiple nozzles spaced around the exterior of the second stage. The orbital delivery vehicle may include a guidance, navigation, and control system configured to control the operation of the engine(s).

The engine of the orbital delivery vehicle may be an altitude compensating nozzle engine, suitable engines may include a linear, curvilinear, annular, or toroidal aerospike engine. The engine of the orbital delivery vehicle may comprise an aerospike engine including an annular combustion chamber, throat, and nozzle. The nozzle of the aerospike engine being located around the exterior of the second stage. The nozzle of the aerospike engine may include multiple septums dividing the nozzle into multiple sections.

The multiple stage orbital delivery vehicle may further comprise a third stage releasably connected to the orbital delivery vehicle below the first stage. The third stage may comprise a third fuel tank and a third fuel system. The engine(s) of the orbital delivery vehicle may use fuel from the third fuel tank when the third stage is connected to the orbital delivery vehicle, may use fuel from the first fuel tank when the third stage has been disconnected from the orbital delivery vehicle while the first stage is connected to the orbital delivery vehicle, and may use fuel from the second fuel tank when the first stage has been disconnected from the orbital delivery vehicle. The engine(s) of the orbital delivery vehicle may be adapted to use fuel from any fuel tank that is connected to the orbital delivery vehicle. The engine may be adapted to use fuel from fuel tanks in a specific order or may be adapted to use fuel simultaneously from any fuel tank connected to the orbital delivery vehicle. The guidance, navigation, and control system may control the use of fuel by the engine(s) from the fuel tanks connected to the multiple stage orbital delivery vehicle.

The multiple stage orbital delivery vehicle may further comprise a first oxidizer tank and first oxidizer system in the first stage and a second oxidizer tank and a second oxidizer system in the second stage. The first oxidizer system may comprise a first oxidizer line and the second oxidizer system may comprise a second oxidizer line. The second oxidizer line may be in releasable fluid communication with the first oxidizer line. The engine(s) of the multiple stage orbital delivery vehicle may use a combination of fuel and oxidizer from the first fuel tank and the first oxidizer tank or from the second fuel tank and the second oxidizer tank. In an embodiment, the engine(s) of the multiple stage orbital delivery vehicle may use a combination of fuel and oxidizer from the first fuel tank and the first oxidizer tank when the first stage is connected to the orbital delivery vehicle and use a combination of fuel and oxidizer from the second fuel tank and the second oxidizer tank when the first stage has been disconnected from the orbital delivery vehicle.

One embodiment is a method of launching a multiple stage orbital delivery vehicle. The method comprises using fuel from a first fuel tank of a lower stage of the orbital delivery vehicle in an engine connected to an upper stage of the orbital delivery vehicle. The lower stage is releasably connected to the orbital delivery vehicle. The method comprises disconnecting the lower stage from the orbital delivery vehicle and using fuel in the engine from a second fuel tank located in the upper stage of the orbital delivery vehicle. The lower stage may be disconnected from the multiple stage orbital delivery vehicle when the first fuel tank becomes empty of fuel. The lower stage may be disconnected from the multiple stage orbital delivery vehicle before it becomes empty of fuel. For example, the lower stage may be disconnected upon the vehicle reaching a predetermined altitude or after a predetermined amount of time has elapsed.

The method may further comprise dropping the orbital delivery vehicle from an airborne aircraft. The method may further comprise using fuel from a third fuel tank in the engine after disconnecting the lower stage with the third fuel tank being located in a middle stage between the lower stage and the upper stage of the orbital delivery vehicle. The engine may be adapted to use fuel from the third fuel tank prior to disconnecting the lower stage from the orbital delivery vehicle. The engine may be adapted to use fuel from any fuel tank that is connected to the orbital delivery vehicle. The method may include disconnecting the middle stage from the orbital delivery vehicle prior to using fuel from the second fuel tank in the upper stage of the orbital delivery vehicle. The middle stage may be disconnected from the multiple stage orbital delivery vehicle when the third fuel tank becomes empty of fuel. The middle stage may be disconnected from the multiple stage orbital delivery vehicle before it becomes empty of fuel. For example, the middle stage may be disconnected upon the vehicle reaching a predetermined altitude or after a predetermined amount of time has elapsed.

The method may include opening a payload bay of the upper stage and launching a spacecraft from the payload bay. The method may include flowing fuel through a first fuel line in the lower stage and through a second fuel line in the upper stage to the engine(s). The method may include flowing fuel through a first fuel line in the lower stage and through a second fuel line in the upper stage to the engine(s) and flowing an oxidizer through a first oxidizer line in the lower stage and a second oxidizer line in the upper stage to the engine(s).

One embodiment of a multiple stage orbital delivery vehicle comprises a first stage comprising a first fuel tank and a first fuel system and a second stage comprising a second fuel tank and a second fuel system. The multiple stage orbital delivery vehicle comprises one or more engines in fluid communication with the first fuel tank and the second fuel tank. The one or more engines are adapted to be shared by the first stage and the second stage. The multiple stage orbital delivery vehicle may further comprise a third stage comprising a third fuel tank and a third fuel system. The third stage may be adapted to share one or more engines with the first stage or the second stage.

BRIEF DESCRIPTION OF THE DRAWINGS

FIG. 6 shows a partial cross-section view of an embodiment of a two stage orbital delivery vehicle.

FIG. 7 shows a partial cross-section view of an embodiment of a multi-stage orbital delivery vehicle.

FIG. 8 shows a partial cross-section view of an embodiment of a multi-stage orbital delivery vehicle that includes an aerospike engine.

FIG. 9 shows a partial cross-section view of an embodiment of a two stage orbital delivery vehicle adapted to use a bi-propellant.

Figure 1:
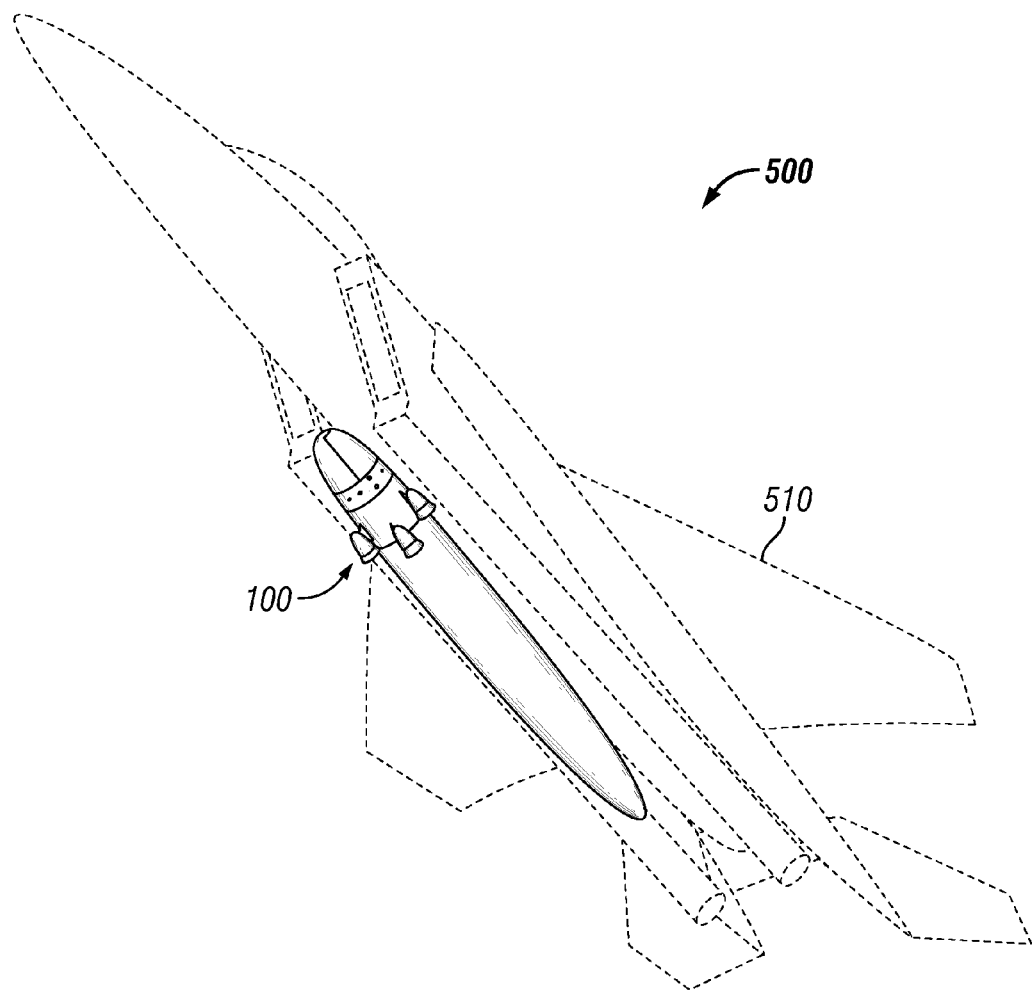
FIG. 1 shows an embodiment of a launch system for a two-stage orbital delivery vehicle.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows one embodiment of a launch system 500 comprising an optional launch assist aircraft 510 carrying a multiple stage orbital delivery vehicle 100. In the illustrated embodiment, the optional launch assist aircraft 510 comprises a Boeing F-15 Eagle fighter aircraft, although those of ordinary skill in the art will appreciate that the optional launch assist aircraft 510 may comprise a wide variety of other suitable aerial vehicles. In some embodiments, the multiple stage orbital delivery vehicle 100 is launched from the optional launch assist aircraft 510 after obtaining a predetermined altitude to assist in the launch of the multiple stage orbital delivery 100 into orbit. In other embodiments, the multiple stage orbital delivery vehicle 100 is adapted to launch off the ground and obtain orbit without the assistance of the optional launch assist aircraft 510.

Figure 2:
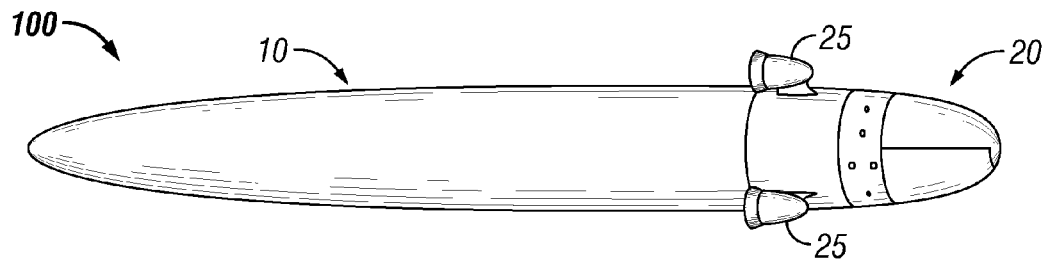
FIG. 2 shows an embodiment of a two stage orbital delivery vehicle with the lower stage connected to the upper stage.

FIG. 2 shows an embodiment of a multiple stage orbital delivery vehicle 100 that includes a first or lower stage 10 connected to a second or upper stage 20. The depiction of two stages is for illustrative purposes only, as the multiple stage orbital delivery vehicle 100 may include various number of stages necessary for the vehicle 100 to obtain orbit. The upper stage 20 includes one or more engines 25 that burn fuel to provide thrust in launching the multiple stage orbital delivery vehicle 100 into orbit. The multiple stage orbital delivery vehicle 100 may include a single engine having multiple nozzles around the perimeter of the vehicle. The engine(s) 25 may be located around the perimeter of the vehicle 100. The number of engines 25 and the spacing around the perimeter of the vehicle 100 may be varied as would be appreciated by one or ordinary skill in the art having the benefit of this disclosure.

In one embodiment only a single stage of the multiple stage orbital vehicle 100 includes an engine 25 (or a plurality of engines 25). The single stage that includes an engine 25 is the upper stage 20. In some embodiments (not shown), the upper stage 20 includes a single engine 25 with a plurality of nozzles connected to the single engine 25. In some embodiments, two stages may share an engine or engines located on the upper stage. With only the upper stage 20 including an engine 25, the design of the multiple stage orbital delivery vehicle 100 can advantageously be simplified. One or more lower stages 10 can simply comprise fuel tanks that are selectively connected to the upper stage 20 to provide fuel to the engine(s) 25 in the upper stage 20. Once a lower stage 10 is empty of fuel, the lower stage 10 may be dropped from the multiple stage orbital delivery vehicle 100. This configuration also permits the vehicle 100 to include only one vehicle attitude control system that is located in the upper stage 10 to control the operation of the engine(s) 25. The vehicle axial and attitude control system controls a valve(s) in the engine(s) 25 to control the thrust from each individual engine. In operation, the guidance, navigation, and control system 130 (shown in FIG. 6) controls the combustion of fuel in each engine 25 to adjust the thrust provided by each individual engine 25, thereby controlling the flight of the multiple stage orbital delivery vehicle 100.

Figure 3:
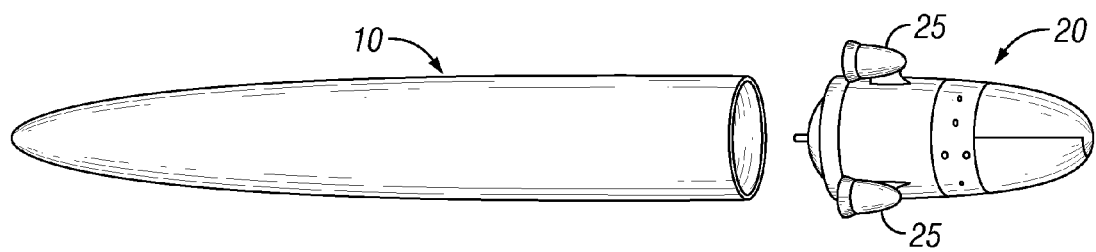
FIG. 3 shows an embodiment of a two stage orbital delivery vehicle with the lower stage disconnected from the upper stage.
Figure 4:
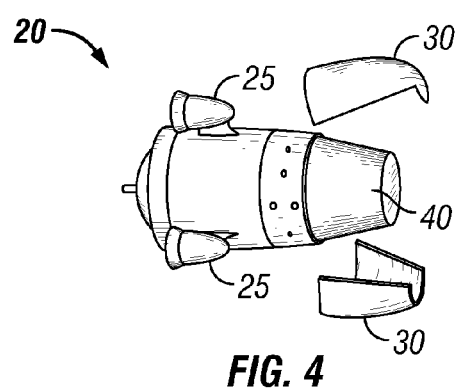
FIG. 4 shows an embodiment of an upper stage of a two stage orbital delivery vehicle with the fairings being jettisons away to reveal the payload.
Figure 5:
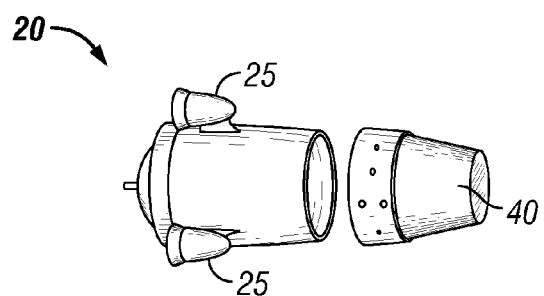
FIG. 5 shows an embodiment of an upper stage of a two stage orbital delivery vehicle with the payload being launched from the upper stage.

FIGS. 3-5 show the multiple stage orbital delivery vehicle 100 dropping the lower stage 10 and launching a payload 40. The lower stage 10 is typically dropped after the tank in the lower stage 10 has become empty, as shown in FIG. 3. Although only one lower stage 10 is shown in the illustrated embodiment, the multiple stage orbital delivery vehicle 100 could include multiple lower stages 10 that could also be dropped during the flight of the vehicle 100. To launch the payload 40, which may be an orbiting device such as a satellite, from the upper stage 20, the upper stage 20 may include fairings 30 that are jettisoned away from the upper stage 20 to reveal the payload, as shown in FIG. 4. The payload 40 may then be deployed from the upper stage 20, as shown in FIG. 5.

FIG. 6 shows a cross-section of an embodiment of a multiple stage orbital delivery vehicle 100 that uses a liquid monopropellant fuel. The lower stage 10 comprises a fuel tank 11 and a fuel line 15 that connects to a fuel line 21 in the upper stage 20 to provide fuel to the engine(s) 25 via lines 22. Once the fuel tank 11 in the lower stage 10 is dropped from the multiple stage orbital delivery vehicle 100, the engine(s) 25 will begin to burn fuel from the fuel tank 24 in the upper stage 20 delivered via fuel lines 21 and 22. The lower stage 10 may be dropped when the fuel tank 11 has become substantially empty. However, the lower stage 10 may be selectively dropped from the multiple stage orbital delivery vehicle 100 prior to the fuel tank 11 becoming substantially empty. The lower end of the fuel line 21 of the upper stage 20 may include a valve 23, such as a check valve, that prevents downward flow of fuel out of line 21 after the lower stage 10 has been dropped from the multiple stage orbital delivery vehicle 100.

The upper stage 20 includes one or more engines 25 that burn fuel from the fuel tanks 11, 24 in each stage to produce the thrust to launch the multiple stage orbital delivery vehicle 100 into orbit. As discussed above, a guidance, navigation, and control system 130 may be used to control the thrust provided by each individual engine 25 to control the vehicle 100 during flight. The engine(s) 25 may be moved to change the thrust vector. The movement of the each individual engine 25 may also be controlled by the guidance, navigation, and control system 130.

The upper stage 20 includes a payload 40, which may comprise an orbital device such as a satellite, located in a cavity in the upper stage 20. The upper stage 20 could include a nose cap that is jettisoned away with the fairings 30 to expose the payload 40. In one embodiment, the guidance, navigation, and control system 130 may be integral with the payload 40 and used to control both the payload 40 after deployment from the upper stage 20, as well as the operation of the engine(s) 25 during the launch of the vehicle 100.

FIG. 7 shows an embodiment of a multiple stage orbital delivery vehicle 200 that includes a first or lower stage 210, a second or middle stage 270, and a third or upper stage 220. The multiple stage orbital delivery vehicle 200 comprises one or more engines 225 located in the upper stage 220 only. The lower stage 210 and middle stage 270 do not include any engines. In the embodiment illustrated in FIG. 7, the lower stage 210 includes a fuel tank 211 and a fuel line 215 that is connected to a fuel line 275 in the middle stage 270, which is in turn connected to a fuel line 221 in the upper stage 220. Fuel lines 222 connect fuel line 221 with the engines 225 of the upper stage 220.

In operation, fuel can be delivered from the fuel tank 211 in the lower stage 210 to the engine(s) 225 located on the upper stage 220 via fuel lines 211, 275, 221, and 222. Once the fuel tank 211 of the lower stage 210 is empty, the lower stage 210 will be dropped from the multiple stage orbital delivery vehicle 200. The engine(s) 225 of the vehicle 200 will then begin to burn fuel from the fuel tank 271 of the middle stage 270. Fuel from the fuel tank 271 in the middle stage 270 will be delivered to the engine(s) 225 via fuel lines 275, 221, and 222. Fuel line 275 may include a valve 276, such as a check valve, at the lower end that prevents the downward flow of fuel out of the end of fuel line 275 after the lower stage 210 has been disconnected from the multiple stage orbital delivery vehicle 200. Once the fuel tank 271 of the middle stage 270 is empty, the middle stage 270 may be dropped from the vehicle 200. The engine(s) 225 will then burn fuel from the fuel tank 224 in the upper stage 220, with the fuel being delivered to the engine(s) 225 via fuel lines 222 and 223. Fuel line 222 may include a valve 226 that prevents the downward flow of fuel out of the end of fuel line 222. The upper stage 220 may then launch a payload device in the same manner as discussed above. The multiple stage orbital delivery vehicle 200 may include more stages than three stages as depicted, as would be recognized by one of ordinary skill in the art having the benefit of this disclosure.

FIG. 8 shows an embodiment of a multiple stage orbital delivery vehicle 300 that includes a lower stage 310 having a fuel tank 311 and fuel line 315 that is connected to a fuel line 321 of the upper stage 320. In the embodiment shown in FIG. 8, the upper stage 320 includes an aerospike engine 325 comprising a combustion chamber 323, throat 324, and nozzle 326. Fuel line 321 may be connected directly to the combustion chamber 323. Alternatively, an additional fuel line may connect fuel line 321 to the combustion chamber 323. The throat 324 connects the nozzle 326 to the combustion chamber 323. The nozzle 326 encircles the entire perimeter of the upper stage 320. The aerospike engine 325 may include a plurality of septums 327 that divide the nozzle 326 into a plurality of sections. The plurality of sections can be controlled by a navigation and guidance system to adjust the thrust of each section controlling the flight of the multiple stage orbital delivery vehicle 300. As described above, the lower stage 310 of the multiple stage orbital delivery vehicle 300 may be dropped after the fuel tank 311 becomes empty. The fuel line 321 may include a valve 328 to prevent leakage of fuel after the lower stage 310 has been disconnected.

FIG. 9 shows an embodiment of a multiple stage orbital delivery vehicle 400 that uses a bi-propellant fuel. The multiple stage orbital delivery vehicle 400 includes a lower stage 410 connected to an upper stage 420. Additional stages could be connected to the multiple stage orbital delivery vehicle 400, as would be appreciated by one of ordinary skill in the art. The multiple stage orbital delivery vehicle 400 comprises one or more engines 425 located in the upper stage 420 only. The lower stage 410 does not include any engines.

The lower stage 410 includes an oxidizer tank 411 with an oxidizer line 413 connected to a manifold 431 in the upper stage 420. The lower stage 410 also includes a fuel tank 412 with a fuel line 414 connected to a the manifold 431 in the upper stage 420. A bulkhead or wall 415 divides the lower stage into an oxidizer tank 411 and a fuel tank 412. In operation, the oxidizer in the oxidizer tank 411 is delivered to the engine(s) 425 on the upper stage 420 via oxidizer line 413, manifold 431, and lines 432 and the fuel in the fuel tank 412 is delivered to the engine(s) 425 on the upper stage 420 via fuel line 414, manifold 431, and lines 432.

Thrust is provided by the combination of the oxidizer and the fuel at the engine(s) 425 of the upper stage 420. The thrust of each engine 425 may be controlled by the guidance, navigation, and control system 430, which may comprise a conventional navigation and guidance system that may be incorporated into a payload device in the upper stage 420. Once the oxidizer tank 411 and fuel tank 412 are empty, the lower stage 410 will be dropped from the upper stage 420. Oxidizer line 413 and fuel line 414 are adapted to break apart when the lower stage 410 is dropped from the upper stage 410 with a portion of the lines remaining in the upper stage 410. The upper portion of lines 413 and 414 may include valves 426 and 427 that prevent the downward flow of oxidizer and fuel out of tanks 421 and 422 upon the separation of the lower stage 410 from the upper stage 420. After the lower stage 410 is disconnected from the upper stage 420, oxidizer will be delivered to the engine(s) 425 from oxidizer tank 421 via oxidizer line 423, manifold 433, and lines 434. Likewise, fuel will be delivered to the engine(s) 425 from fuel tank 422 via fuel line 424, manifold 433, and lines 434. A bulk head or wall 428 divides the upper stage into an oxidizer tank 421 and a fuel tank 422. The configuration of the oxidizer and fuel tanks is for illustrative purposes and may be varied.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

TABLE OF REFERENCE NUMERALS FOR FIGS. 1-9

10 first or lower stage of a two stage orbital delivery vehicle
11 fuel tank in lower stage
15 fuel line in first stage
20 second or upper stage of a two stage orbital delivery vehicle
21 fuel line in second stage
22 fuel line to engine on second stage
23 valve in fuel line
24 fuel tank in upper stage
25 nozzle or engine on upper stage
30 fairing enclosing payload bay
40 payload or spacecraft
100 two stage orbital delivery vehicle
130 guidance, navigation, and control system
200 multiple stage orbital delivery vehicle
210 first or lower stage of multiple orbital delivery vehicle
211 fuel tank in lower stage
215 fuel line in lower stage of multiple orbital delivery vehicle
220 third or upper stage of multiple orbital delivery vehicle
221 fuel line in upper stage of multiple orbital delivery vehicle
222 fuel line to engine in upper stage
224 fuel tank of upper stage
225 engine(s)
226 valve in fuel line of upper stage
270 second or middle stage of multiple orbital delivery vehicle
271 fuel tank in middle stage
275 fuel line in middle stage
276 valve in fuel line in middle stage
300 multiple stage orbital delivery vehicle with an aerospike engine
310 lower stage
311 fuel tank in lower stage
315 fuel line in lower stage
320 upper stage
321 fuel line in upper stage
322 fuel line to combustion chamber
323 combustion chamber
324 throat of aerospike engine
325 aerospike engine
326 nozzle of aerospike engine
327 septums diving nozzle into sections
400 multiple stage orbital delivery vehicle using bi-propellant
410 lower stage
411 oxidizer tank in lower stage
412 fuel tank in lower stage
413 oxidizer line in lower stage
414 fuel line in lower stage
415 middle bulkhead in lower stage
420 upper stage
421 fuel tank in upper stage
422 oxidizer tank in upper stage
423 fuel line in upper stage
424 oxidizer line in upper stage
425 engine(s)
426 valve in oxidizer line
427 valve in fuel line
428 middle bulkhead in upper stage
430 guidance, navigation, and control system
431 manifold connected to lines from lower stage
432 lines connecting manifold 431 to engine(s)
433 manifold connected to lines from upper stage
434 lines connecting manifold 433 to engine(s)
500 launch system
510 optional launch assist aircraft

What is claimed is:

1. A multiple stage orbital delivery vehicle comprising:
a first stage releasably connected to the orbital delivery vehicle, the first stage comprising a first fuel tank and a first fuel system; and
a second stage comprising a second fuel tank and a second fuel system,
the second stage further comprising one or more engines in fluid communication with the first and second fuel systems, wherein the one or more engines use fuel from the first fuel tank or the second fuel tank, wherein the first stage is positioned coaxially with the second stage and positioned below the second stage.

2. The multiple stage orbital delivery vehicle of claim 1, wherein only a single stage of the multiple stage orbital delivery vehicle includes an engine.

3. The multiple stage orbital delivery vehicle of claim 1, the second stage further comprising a payload bay that may be selectively opened.

4. The multiple stage orbital delivery vehicle of claim 3 further comprising a spacecraft positioned in the payload bay.

5. The multiple stage orbital delivery vehicle of claim 1, wherein the first fuel tank and the second fuel tank are adapted to contain a liquid propellant.

6. The multiple stage orbital delivery vehicle of claim 5, wherein the liquid propellant comprises a monopropellant.

7. The multiple stage orbital delivery vehicle of claim 5, wherein the liquid propellant comprises a bi-propellant.

8. The multiple stage orbital delivery vehicle of claim 1, the second fuel system further comprising a valve to prevent leakage of fuel upon the disconnection of the first stage.

9. The multiple stage orbital delivery vehicle of claim 1, wherein the one or more engines comprise at least three engines, each engine having a nozzle, and wherein the nozzles are laterally spaced around an exterior of the second stage.

10. The multiple stage orbital delivery vehicle of claim 1, further comprising a guidance, navigation, and control system configured to control the operation of the one or more engines.

11. The multiple stage orbital delivery vehicle of claim 1, wherein the one or more engines comprise an aerospike engine including an annular combustion chamber, throat, and nozzle, the nozzle being located laterally around an exterior of the second stage.

12. The multiple stage orbital delivery vehicle of claim 11, wherein the nozzle includes multiple septums dividing the nozzle into multiple sections.

13. The multiple stage orbital delivery vehicle of claim 1 further comprising a third stage releasably connected to the orbital delivery vehicle below the first stage, the third stage comprising a third fuel tank and a third fuel system, wherein the one or more engines use fuel from first fuel tank, the second fuel tank, or the third fuel tank, and wherein the first stage is positioned between the third stage and the second stage.

14. The multiple stage orbital delivery vehicle of claim 1 further comprising:
   a first oxidizer tank and a first oxidizer system in the first stage; and
   a second oxidizer tank and a second oxidizer system in the second stage
   wherein the one or more engines use a combination of fuel and oxidizer from the first fuel tank and the first oxidizer tank or from the second fuel tank and the second oxidizer tank.

15. The multiple stage orbital delivery vehicle of claim 1, wherein the first stage comprises an upper end and a lower end and wherein the upper and lower ends are located beneath the one or more engines of the second stage.

16. A multiple stage orbital delivery vehicle comprising:
   a first lower stage comprising a first fuel tank and a first fuel system;
   a second upper stage comprising a second fuel tank and a second fuel system;
   one or more engines connected to the second upper stage in fluid communication with the first fuel tank and second fuel tank, the one or more engines adapted to be shared by the first stage and the second stage, wherein the first lower stage is coaxial with the second upper stage.

17. The multiple stage orbital delivery vehicle of claim 16 further comprising a third stage comprising a third fuel tank and a third fuel system, wherein the third stage is adapted to share one or more engines with the first stage or the second stage, and wherein the first lower stage is positioned between the second upper stage and the third stage.

18. The multiple stage orbital delivery vehicle of claim 16, wherein the first lower stage has an upper end and a lower end and wherein the upper and lower ends are located beneath the one or more engines connected to the second upper stage.

* * * * *